United States Patent [19]
Takiura

[11] 3,985,484
[45] Oct. 12, 1976

[54] METHOD OF MOLDING SYNTHETIC RESINS MATERIALS THROUGH HIGH-PRESSURE FLUID CROSS-LINKING PROCESS AND RELEVANT APPARATUS

[75] Inventor: Mamoru Takiura, Kawasaki, Japan
[73] Assignee: Ikegai Tekko Kabushiki Kaisha, Tokyo, Japan
[22] Filed: Jan. 15, 1975
[21] Appl. No.: 541,269

Related U.S. Application Data
[62] Division of Ser. No. 289,993, Sept. 18, 1972, Pat. No. 3,876,736.

[30] Foreign Application Priority Data
Sept. 30, 1971  Japan .............................. 46-75818

[52] U.S. Cl. .............................. 425/145; 425/205; 425/376
[51] Int. Cl.² .............................................. B29B 1/06
[58] Field of Search ............ 425/145, 146; 18/13 N, 18/13 P, 12 P, 30 AA, 30 AS, 30 QP

[56] References Cited
UNITED STATES PATENTS

| | | | |
|---|---|---|---|
| 2,620,922 | 12/1952 | Deutsch | 18/30 QP |
| 3,158,901 | 12/1964 | Westover | 425/378 |
| 3,721,512 | 3/1973 | Ma et al. | 425/149 |
| 3,750,134 | 7/1973 | Weisend | 425/145 |
| 3,767,339 | 10/1973 | Hunkar | 425/154 |
| 3,891,372 | 6/1975 | Takiura | 425/245 R |

FOREIGN PATENTS OR APPLICATIONS

| | | | |
|---|---|---|---|
| 1,007,053 | 10/1957 | Germany | 425/378 |

Primary Examiner—Francis S. Husar
Assistant Examiner—Carl Rowold
Attorney, Agent, or Firm—Woodhams, Blanchard and Flynn

[57] ABSTRACT

A method of molding a synthetic resin which comprises: kneading a mixture obtained by dispersing a cross-linking agent in said synthetic resin, while melting said resin by applying such temperature and pressure as will not give rise to cross-linking reaction, introducing the thus kneaded mixture into plural reaction chambers to effect cross-linking therein by applying an appropriate temperature and high pressure, and extruding the thus cross-linked material continuously from said reaction chambers through a head die for molding purpose; and a molding apparatus relevant to said method.

1 Claim, 11 Drawing Figures

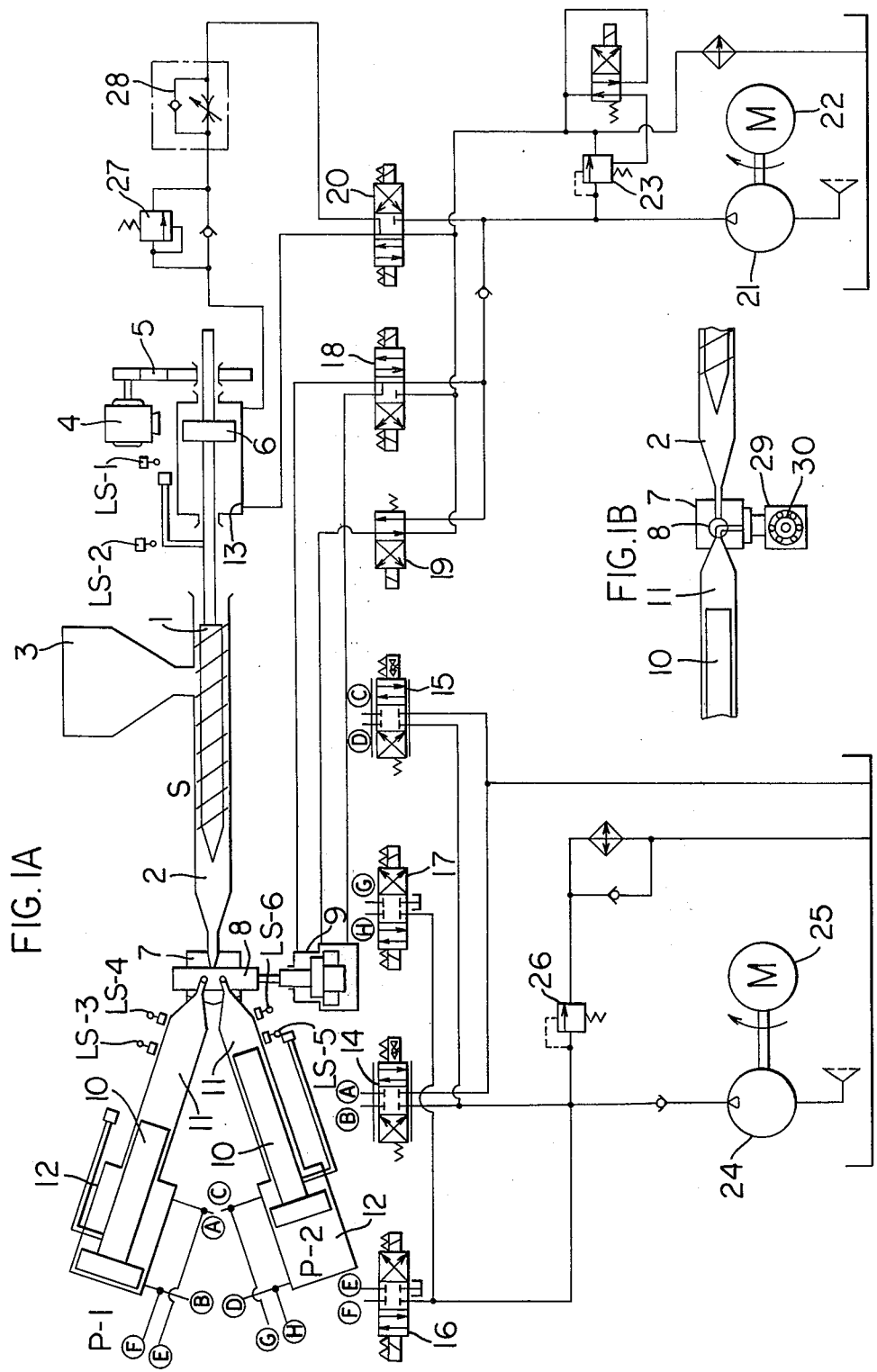

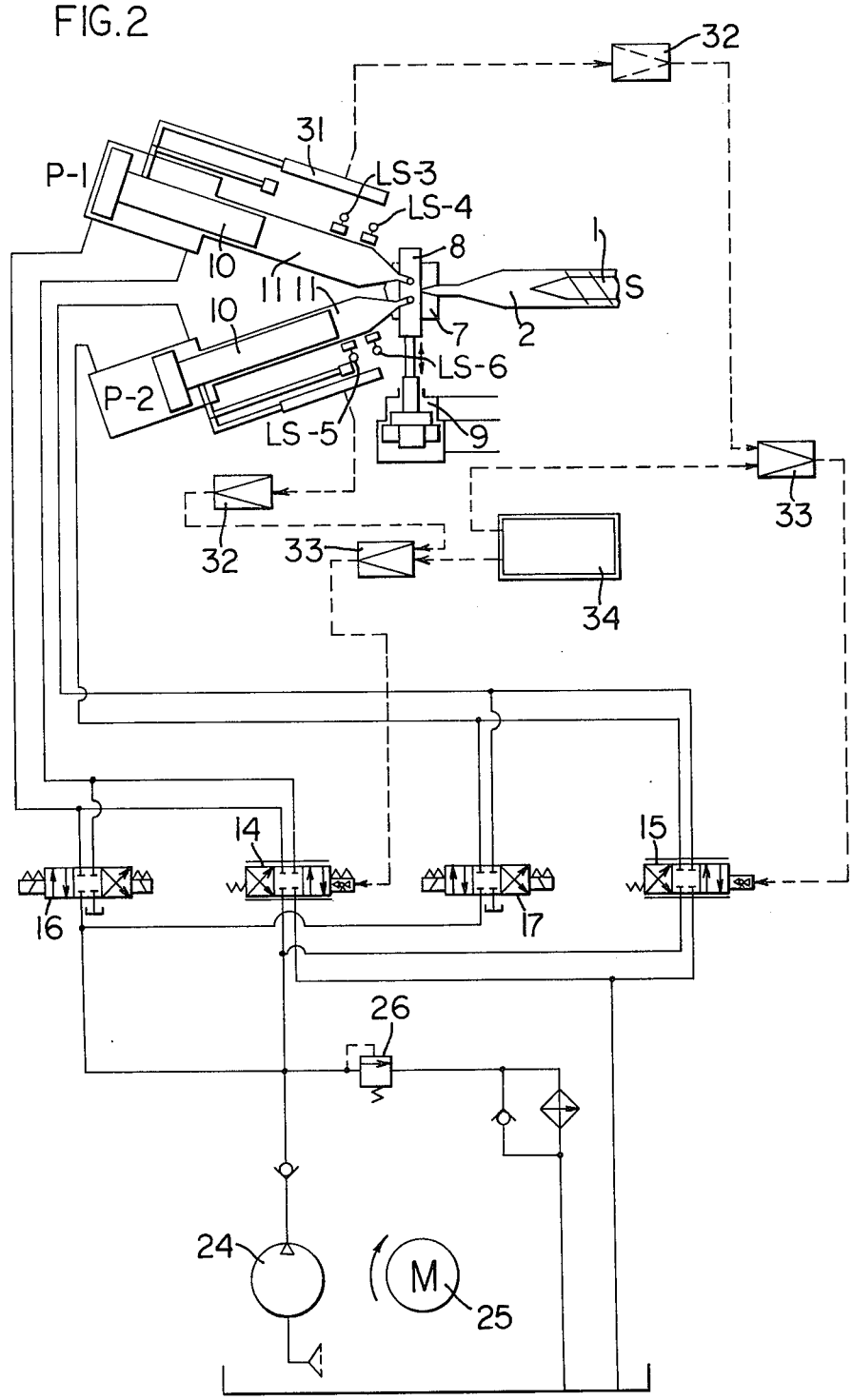

3,985,484

METHOD OF MOLDING SYNTHETIC RESINS MATERIALS THROUGH HIGH-PRESSURE FLUID CROSS-LINKING PROCESS AND RELEVANT APPARATUS

This is a division of application Ser. No. 289,993, filed Sept. 18, 1972, now U.S. Pat. No. 3,876,736.

BACKGROUND OF THE INVENTION a. Field of the Invention

The present invention relates to an improvement in the method of producing uniform molded articles from a mixture of a synthetic resin and a cross-linking agent, as well as a molding apparatus pertaining to said method.

b. Description of the Prior Art

Cross-linking of a polyolefin resin, such as polyethylene, is usually performed by a procedure whereby a mixture obtained by uniformly dispersing a cross-linking agent in said polyethylene is first made into molded articles by means of an extrusion-molding machine, followed by a cross-linking process. As widely used known cross-linking processes, there are the high-pressure steam process, the high-temperature liquid process, the lead-encasing vulcanization process, the Grace's process, the radiation process, etc.; each process having merits and demerits. In addition, there has recently been developed a new cross-linking process called Engel's process. According to Engel's process, a cross-linking agent is mixed with a thermoplastic material within a screw-driven extruding machine, the resulting mixture is introduced into a pressure chamber to be compressed under a pressure of 2000 Kg/cm$^2$ instantaneously to effect uniform dispersion of said cross-linking agent without giving rise to the cross-linking reaction, and then the thus treated mixture is passed through a die held at a temperature high enough to effect the cross-linking reaction to thereby accomplish the desired cross-linking. An object of this process is to achieve uniform dispersion of the cross-linking agent by means of said pressure chamber, and cross-linking by heating from the outside at the time of passing the mixture through said die. It is technically based on the conception that said thermoplastic material acquires a heat curing property after completion of the cross-linking reaction and is no longer suitable for molding or drawing. Consequently, molding by this process must be performed just before the material becomes unsuitable for molding or drawing and is therefore very unstable.

SUMMARY OF THE INVENTION

The present invention relates to a method of extruding a synthetic resin material, such as polyolefin resin, polyvinyl chloride, etc., which comprises: kneading by means of a screw a mixture obtained by uniformly dispersing a cross-linking agent in said resin during melting of said material by applying such temperature and pressure as will not give rise to the cross-linking reaction, introducing the thus kneaded mixture into the reaction chamber to effect cross-linking therein by applying an appropriate temperature and high pressure, and extruding the thus cross-linked material continuously through a head die for molding purposes; and a molding apparatus relevant to said method. In this connection, the present apparatus is also applicable in the production of foamy moldings from a mixture of a synthetic resin and a foaming agent such as organic peroxides and the like.

A factor requisite for satisfactory realization of the function of an apparatus of this kind is to secure uniformity in size of the extruded moldings at the time when the material held in the main reaction chamber upon plasticizing by the screw is introduced into the plunger-type secondary reaction chamber and further extruded into the molding head die. And, in case of an apparatus employing a plural number of plungers, a particularly important thing is whether a change in size can be prevented at the time of switching the extrusion from one plunger to another. In other words, the operation is accompanied by various risks, such that: if it is so devised as to set one plunger in motion after another plunger has come to a halt, the extruded moldings will have distinct seams; and if it is so devised as to put a plural number of plungers in motion simultaneously for a certain period of time, the quantity of material being extruded will increase particularly during said period, resulting in a lack of uniformity in size of the moldings; and so on.

The present invention has as an object to avoid the foregoing troubles in the prior art. To be precise, an object is to provide a method of working a double plunger by automatically controlling the speed of the constituent plungers according to a prescribed velocity program in order to maintain the volume of the material to be extruded per unit time uniformly, and to provide a molding apparatus characterized in that it ensures a stable extrusion of the material in relation to the work of the transfer valves.

DESCRIPTION OF THE PREFERRED EMBODIMENTS

In the accompanying drawings, FIG. 1A is a schematic illustration showing the overall structure of the machine including the pressure-oil circuit system of a high-pressure fluid cross-linking molding apparatus according to the present invention.

FIG. 1B is a detail drawing showing the transfer valve.

FIG. 2 is a detail drawing showing the structure of the plunger member as well as the transfer valve member, along with the pressure-oil circuit system and the electric control system therefor.

Figure 3A:
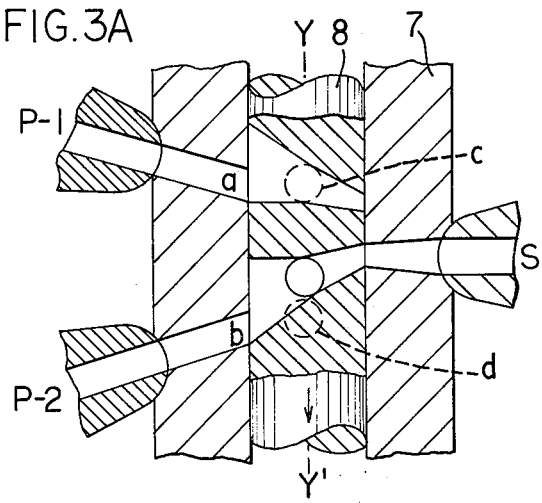
Figure 3A:
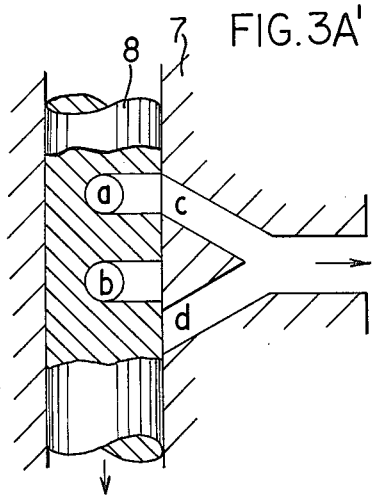
Figure 3B:
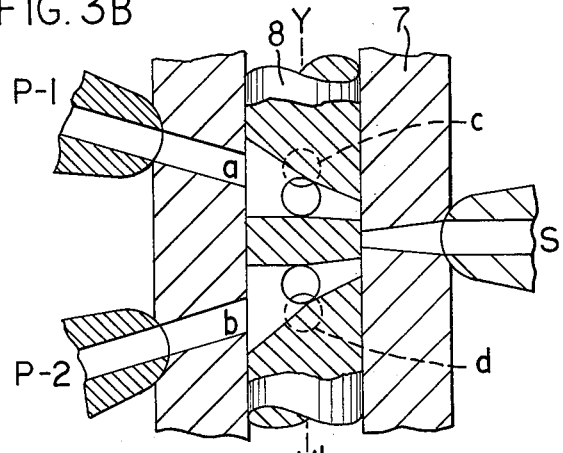
Figure 3B:
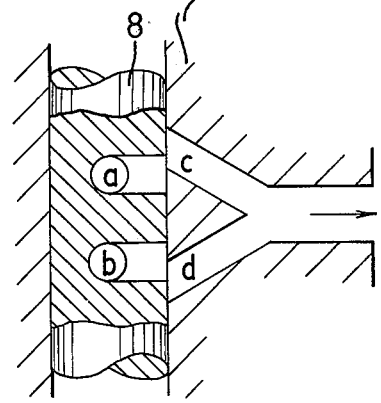
Figure 3C:
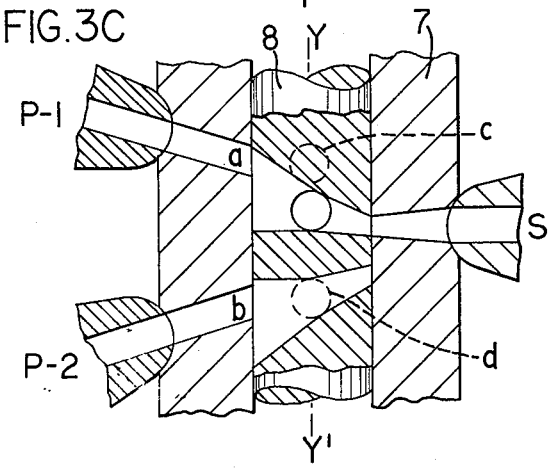
Figure 3C:
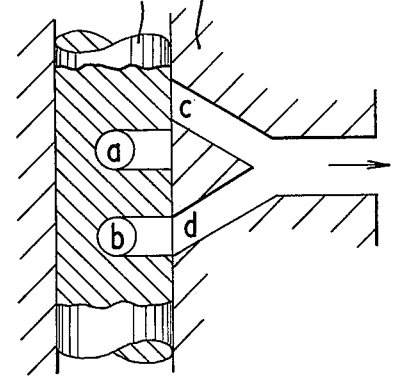

FIGS. 3A–3C' are drawings showing the transverse section and longitudinal section of the transfer valve.

Figure 4:
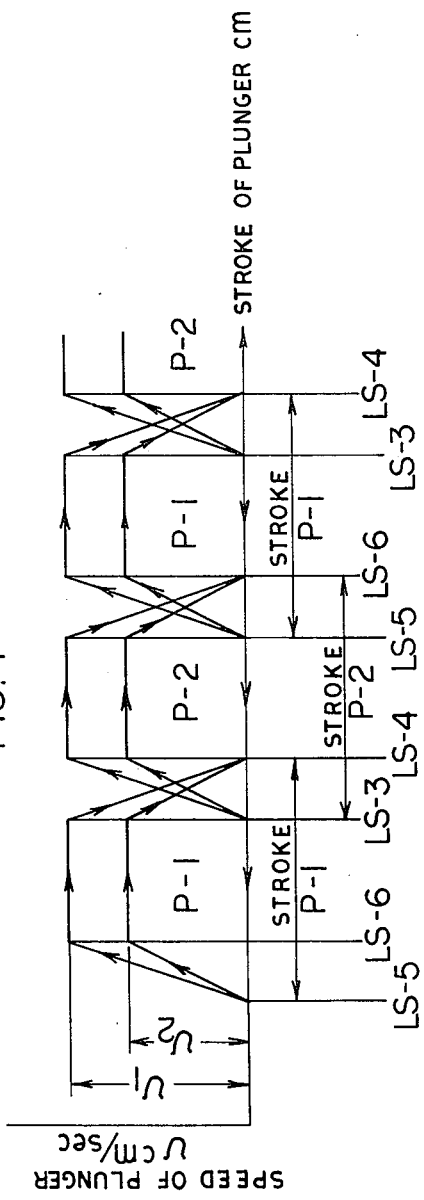

FIG. 4 is a diagrammatic representation of the relation between the stroke and the speed of the plunger.

Figure 5:
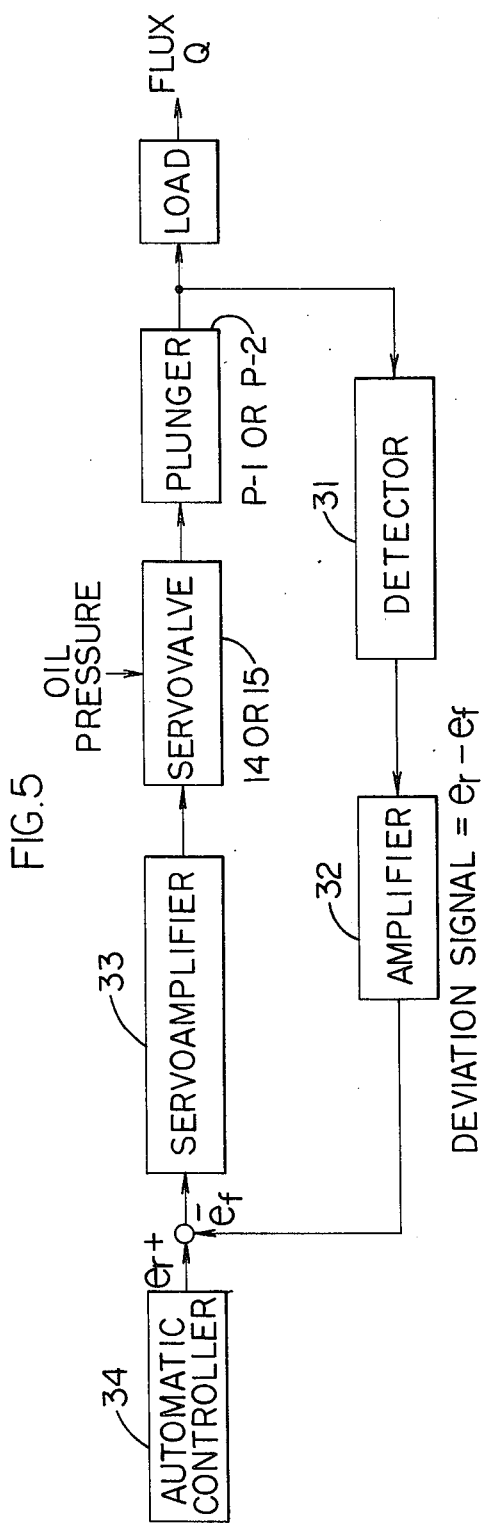

FIG. 5 is a diagrammatic representation of the control block for the electric and oil pressure servovalve mechanism.

Referring to FIG. 1A, FIG. 1B and FIG. 2, the numeral reference 1 denotes the screw used for the purpose of plasticization and injection, 2 denotes the main reaction chamber to retain the plasticized material, 3 denotes the hopper, 4 denotes the electric motor to drive said screw, 5 denotes the reduction gear, 6 denotes the piston to push said screw, 7 denotes the transfer valve housing, 8 denotes the transfer valve, 9 denotes the two-stage special cylinder, 10 denotes the plunger, 11 denotes the secondary reaction chamber, 12 denotes the oil-pressure cylinder for the plunger, 13 denotes the oil-pressure cylinder for the screw, 14 denotes the servovalve for use in advancing the plunger P-1, 15 denotes the servovalve for use in advancing the plunger P-2, 16 and 17 are the solenoid valves to work when the plungers P-1 and P-2 are pushed back by the injection screw 1 — with the material between said screw and the respective plunger — under a pressure, 26 denotes the relief valve to control the oil pressure for the circuit at this juncture, and 24 and 25 denote the pump equipped for the pressure-oil circuit to work said plungers and the electric motor to drive said pump, respectively.

18 and 19 denote the solenoid valves for the two-stage special cylinder to work the transfer valve, 20 denotes the solenoid valve to work the piston 6 for the screw 1, 28 denotes the flux-controlling valve for the purpose of regulating the speed of screw when the piston 6 is pushed to advance the screw, 23 denotes the relief valve to control the oil pressure of the circuit at this juncture. 27 denotes the relief valve for the purpose of controlling the backpressure when the screw makes a back stroke while plasticizing the material, and 21 and 22 denote the pump equipped for the pressure-oil circuit to work said injection screw and transfer valve and the electric motor to drive said pump, respectively.

29 denotes the molding head die, 30 denotes the moldings, 31 denotes the detector to detect the positions of the plungers P-1 and P-2 in motion, and 32 denotes the amplifier to amplify the signal given by said detector.

34 denotes the automatic controller to instruct the motions of the plunger, and 33 denotes the amplifier to amplify the instruction signal directed to the servovalve.

The screw 1 is driven by the driving electric motor 4 and plasticizes the material. The thus plasticized material is extruded into the main reaction chamber 2, the pressure within said reaction chamber being held at a backpressure as set by the relief valve 27, and the screw 1 moves backward from the position of limit switch LS-2 to the position LS-1 and comes to a halt. While the screw is moving backward to thereby plasticize the material, the transfer valve 8 is in the state as shown in FIG. 3 (A). In the meantime, the plunger P-1 is advancing in accordance with the velocity program (See FIG. 4) as set by the automatic controller 34, and the material is being extruded by the molding head die. Subsequently, the injection screw pushes the material held in the main reaction chamber into the secondary reaction chamber 11 of the plunger P-2 through the transfer valve 8 by virtue of the pressure set by the relief valve 23. On this occasion, said plunger moves backward by virtue of the difference between the pressure set by the relief valve 26 and the pressure set by the relief valve 23 (it is essential that the pressure set by the relief valve 23 is higher than the pressure set by the relief valve 26).

When the plunger is moving backward, the material is in the state of being subjected to the pressure set by the relief valve 26.

Next, when the plunger P-1 advances to the position of the limit switch LS-3, the speed of the plunger P-1 reduces rectilinearly from a fixed speed $v$ toward zero according to the signal of LS-3, while the speed of the plunger P-2 increases rectilinearly from zero toward a fixed speed $v$. By the signal of the limit switch LS-3, the position of the transfer valve shifts to the neutral position as shown in FIG. 3 (B). In this state, the plunger P-1 attains the speed of zero at the position of the limit switch LS-4 and comes to halt. And, by the signal of LS-4, the plunger P-2 attains a fixed speed $v$. By the signal of the limit switch LS-4, the position of the transfer valve shifts to the state as shown in FIG. 3 (C). Subsequently, the screw turns again and moves backward from the position of the limit switch LS-2 to the position LS-1 while performing plasticization of the material.

The plungers P-1 and P-2 move in accordance with the velocity diagram (see FIG. 4) set by the automatic controller in advance. To be precise, when a set signal is given by the automatic controller 34, this signal is amplified by the servoamplifier 33 and enters the servovalve. The servovalve then supplies a flux in proportion to this signal to the oil pressure cylinder 12. In the event of the motion of the plunger being inconsistent with the set signal, the detector 31 detects the electric displacement and works to correct said electric displacement for the plunger until the deviation signal indicates zero. FIG. 5 is a block diagram to represent the electric control system for this purpose.

The apparatus according to the present invention has such a merit that, because of its being so devised as to control the speed of plungers by a single automatic controller by virtue of the servovalve and give diagonally opposite signals to a double plunger by the set of limit switches LS-3, LS-4, and the set of limit switches LS-5, LS-6, a regular cycle of the material can be attained even when there is a difference in volume of the material led into the respective secondary reaction chambers between the plungers P-1 and P-2 (that is, when the positions to which the plungers advance are various). Besides, inasmuch as it is so devised as to secure the uniformity in volume of the material to be extruded by controlling the speed by virtue of the movements of the double plunger, it has also the merit that the transfer valve can be of simple structure and suffices to make simple motions. Moreover, because of separate provision of the pressure-oil circuit for the plungers and the pressure-oil circuit for the screw and transfer valve, it is convenient for maintenance, minimizes the occurrence of troubles and ensures a stable operation.

What is claimed is:

1. An apparatus for molding a mixture of a synthetic resin and a cross-linking agent by a high-pressure fluid cross-linking process, comprising: a barrel having a rotatable screw mounted therein for reciprocating movement, means associated with said screw for rotating said screw for plasticizing said mixture and forwarding same to a main reaction chamber located inside said barrel adjacent the discharge end thereof, and fluid pressure motor means connected to said screw for imposing a back pressure on said screw to resist retracting movement thereof so that a charge of plasticized material accumulates at the discharge end of said barrel and is maintained under said back pressure, said fluid pressure motor means also being effective to advance the screw to discharge said plasticized charge from said main reaction chamber; a pair of limit switches associated with said screw; a transfer valve connected to the discharge end of said barrel; means defining first and second secondary reaction chambers having reciprocable plungers therein, each plunger having a fluid pressure motor associated therewith for reciprocating said plungers, and a pair of limit switches associated with each plunger, said secondary reaction chambers being connected to said transfer valve; a molding head die connected to said transfer valve; said transfer valve having a shiftable valve means and a fluid pressure motor for moving said shiftable valve means between two terminal positions and an intermediate position, said shiftable valve means having passages for connecting the discharge end of said barrel alternately to said secondary reaction chambers and for connecting the secondary reaction chamber which is out of communication with the discharge end of said barrel to said molding head die in the respective terminal positions of said shiftable valve means, and in the intermediate position of said shiftable valve means neither of said secondary reaction chamber communicates with the discharge end of said barrel and both of said secondary reaction chambers communicate with said molding head die; first and second detectors associated with said plunger each having an amplifier associated therewith for providing electrical signals in response to the positions of the plungers in the first and second secondary reaction chambers, respectively; an automatic controller for supplying electrical control signals for controlling operation of the plungers; a further pair of amplifiers both connected to said controller and each being connected to the amplifier of one detector so as to respond to the combined signals from said controller and one of said detectors; a first fluid pressure circuit comprising servo valves operated by said further pair of amplifiers for controlling movement of said plungers; and a second fluid pressure circuit comprising valves connected to control the supply of fluid pressure to said fluid pressure motor for said screw and said fluid pressure motor for said shiftable valve element, so that said screw is rotated and is permitted to retract in said barrel against back pressure in the fluid pressure motor for the screw until one of the limit switches associated with the screw is actuated whereupon rotation of the screw is stopped and then the screw is advanced, simultaneously the shiftable valve element is positioned in one terminal position so that the charge in the discharge end of the barrel is fed into one of the secondary reaction chambers against a back pressure on the plunger therein and a previously fed-in charge in the other secondary reaction chamber is discharged therefrom through the molding head die by advancing the plunger therein and when the latter plunger actuates one of its associated limit switches advancing movement of the latter plunger is slowed down and simultaneously advancing movement of the plunger in said one secondary reaction chamber is begun and said shiftable valve element is shifted to its intermediate position so that plasticized material is fed into said molding head die from both secondary reaction chambers, and when said plunger in said other secondary reaction chamber actuates its other limit switch, advancing movement of said latter plunger is stopped and the valve is shifted to its other terminal position, whereupon the cycle repeats with the operations of the secondary reaction chambers being reversed.

* * * * *